US012655985B2

(12) United States Patent
Gonzalez Llana et al.

(10) Patent No.: US 12,655,985 B2
(45) Date of Patent: Jun. 16, 2026

(54) GAS VALVE AND GAS STOVE

(71) Applicant: BSH Hausgeräte GmbH, Munich (DE)

(72) Inventors: Enrique Gonzalez Llana, Miengo (ES); Luis Antonio Palacios Valdueza, Astillero (ES); Roberto Saiz Gonzalez, Villapresente-Cantabria (ES)

(73) Assignee: BSH Hausgeräte GmbH, Munich (DE)

( * ) Notice: Subject to any disclaimer, the term of this patent is extended or adjusted under 35 U.S.C. 154(b) by 615 days.

(21) Appl. No.: 17/436,096

(22) PCT Filed: Mar. 24, 2020

(86) PCT No.: PCT/EP2020/058164
§ 371 (c)(1),
(2) Date: Sep. 3, 2021

(87) PCT Pub. No.: WO2020/200917
PCT Pub. Date: Oct. 8, 2020

(65) Prior Publication Data
US 2022/0186936 A1 Jun. 16, 2022

(30) Foreign Application Priority Data

Apr. 2, 2019 (EP) ..................................... 19382239

(51) Int. Cl.
*F24C 3/12* (2006.01)
*F16K 5/04* (2006.01)
(Continued)

(52) U.S. Cl.
CPC ............ *F24C 3/126* (2013.01); *F16K 5/0414* (2013.01); *F16K 17/048* (2013.01); *F23N 1/007* (2013.01);
(Continued)

(58) Field of Classification Search
CPC .... F16K 17/048; F16K 5/0407; F16K 5/0414; F23N 1/007; F23N 2235/16; F23N 2235/24; F23N 2239/04; F24C 3/126
See application file for complete search history.

(56) References Cited

U.S. PATENT DOCUMENTS 2,855,956 A * 10/1958 Huff .......................... F16K 5/12
137/625.47
5,470,018 A * 11/1995 Smith ..................... F23N 1/007
126/116 A
(Continued)

FOREIGN PATENT DOCUMENTS

CN 1360174 A 7/2002
CN 207848479 U * 9/2018
(Continued)

OTHER PUBLICATIONS

National Search Report EP19382239 dated Sep. 17, 2019.
International Search Report PCT/EP2020/058164 dated Jun. 10, 2020.

*Primary Examiner* — Michael G Hoang
*Assistant Examiner* — Logan P Jones
(74) *Attorney, Agent, or Firm* — Michael E. Tschupp; Andre Pallapies; Brandon G. Braun

(57) ABSTRACT

A gas valve for a gas stove, comprising a valve housing, wherein the valve housing has a gas inlet and a gas outlet, and a gas regulating unit, wherein the gas regulating unit has a cylindrical outer surface, wherein the gas regulating unit is rotatable supported in the valve housing by means of the outer surface, wherein the gas regulating unit has a plurality of gas outlet openings, wherein the gas regulating unit is rotatable into a plurality of flame positions, wherein each gas outlet opening is assigned to one determined flame position, wherein in each flame position the gas inlet is connected to the gas outlet by means of the gas outlet opening which is
(Continued)

assigned to the one determined flame position, and wherein the gas outlet openings have cross-sectional areas which differ from each other in order to achieve different flow rates of gas through the gas valve in the individual flame positions.

15 Claims, 15 Drawing Sheets

(51) Int. Cl.
*F16K 17/04* (2006.01)
*F23N 1/00* (2006.01)
(52) U.S. Cl.
CPC ...... *F23N 2235/16* (2020.01); *F23N 2235/24* (2020.01); *F23N 2239/04* (2020.01)

(56) References Cited

U.S. PATENT DOCUMENTS

| | | | | |
|---|---|---|---|---|
| 2003/0052292 | A1* | 3/2003 | Tranovich | F16K 5/0407 251/209 |
| 2005/0178450 | A1* | 8/2005 | Tupa | F23N 1/007 137/625.47 |

| | | | | |
|---|---|---|---|---|
| 2012/0073562 | A1 | 3/2012 | Albizuri | |
| 2013/0126770 | A1 | 5/2013 | O'Brien | |
| 2013/0240767 | A1 | 9/2013 | Naumann | |
| 2013/0334446 | A1* | 12/2013 | Gur | F16K 37/0033 251/122 |
| 2017/0167732 | A1* | 6/2017 | Palacios Valdueza | A47J 27/002 |
| 2021/0123597 | A1* | 4/2021 | Pablo Curto | F16K 31/0644 |

FOREIGN PATENT DOCUMENTS

| | | | | |
|---|---|---|---|---|
| DE | 551909 C | * | 6/1932 | |
| DE | 10152186 C1 | * | 6/2003 | B01J 4/001 |
| EP | 3412970 A1 | * | 12/2018 | F23N 1/005 |
| FR | 710360 A | | 8/1931 | |
| FR | 1517003 A | * | 2/1968 | |
| FR | 2432122 A1 | * | 2/1980 | |
| JP | H1194100 A | | 4/1999 | |
| WO | WO-2007107781 A1 | * | 9/2007 | F16K 11/065 |
| WO | 2009010400 A1 | | 1/2009 | |
| WO | 2010026058 A1 | | 3/2010 | |
| WO | 2013080116 A2 | | 6/2013 | |
| WO | 2013105378 A1 | | 7/2013 | |
| WO | WO-2019138386 A1 | * | 7/2019 | F16K 5/02 |

* cited by examiner

GAS VALVE AND GAS STOVE

CROSS-REFERENCES TO RELATED APPLICATIONS

This application is the U.S. National Stage of International Application No. PCT/EP2020/058164, filed Mar. 24, 2020, which designated the United States and has been published as International Publication No. WO 2020/200917 A1 and which claims the priority of European Patent Application, Serial No. 19382239.2, filed Apr. 2, 2019, pursuant to 35 U.S.C. 119(a)-(d).

BACKGROUND OF THE INVENTION

The present invention relates to a gas valve for a gas stove and to a gas stove with such a gas valve.

A gas stove comprises at least one or a plurality of gas burners. To adjust the flow rate of gas from a main gas pipe of the gas stove to the gas burners, a gas valve is assigned to each gas burner. The gas valve has a knob which can be rotated to adjust the gas flow.

US 2013/0240767 A1 describes a gas valve unit for setting a gas volume flow supplied to a gas burner of a gas appliance. The gas valve unit includes a valve housing, an actuation pin for setting an opening cross section of the gas valve unit, a shutoff valve, and a linearly displaceable connecting element for transferring a movement of the actuation pin to the shutoff valve.

WO 2010/026058 A1 describes a gas valve for a gas-operated cooking appliance. The gas valve comprises a valve body with a cone-shaped plug receptacle opening. A cone-shaped plug is disposed rotatable in the plug receptacle opening and comprises an outer surface that is designed at least partially from an elastic rubber material.

EP 2 171 325 B1 describes a gas tap device for adjusting a flow of a flowable substance. The tap device comprises a channel unit having at least two channels for a substance to flow through and a cone-shaped base body being moveable supported relative to the channel unit for providing a flow stage to actuate the channels in combination.

BRIEF SUMMARY OF THE INVENTION

It is one object of the present invention to provide an improved gas valve.

Accordingly, a gas valve for a gas stove is provided. The gas valve comprises a valve housing, wherein the valve housing has a gas inlet and a gas outlet, and a gas regulating unit. The gas regulating has a cylindrical outer surface, wherein the gas regulating unit is rotatable supported in the valve housing by means of the outer surface, wherein the gas regulating unit has a plurality of gas outlet openings, wherein the gas regulating unit is rotatable into a plurality of flame positions, wherein each gas outlet opening is assigned to one determined flame position, wherein in each flame position the gas inlet is connected to the gas outlet by means of the gas outlet opening which is assigned to the one determined flame position, and wherein the gas outlet openings have cross-sectional areas which differ from each other in order to achieve different flow rates of gas through the gas valve in the individual flame positions.

Since the gas regulating unit has a cylindrical and not a cone-shaped outer surface, the production of the gas valve is simplified which reduces costs. Since the cross-sectional areas of the gas outlet openings differ from each other, each flame position can be provided with a calibrated gas outlet opening which exactly defines the flow rate of gas flowing through the gas valve in the assigned flame position. The flow rate can therefore be regulated in a completely progressive and linear way. This improves the ease of use for a user using a gas stove with such a gas valve.

The gas valve is a step valve or can be named step valve. This is because of the different flame positions which enable a stepwise increase or decrease of the flow rare. The valve housing may be made of an aluminum alloy or a magnesium alloy. However, any other suitable material may be used. The gas inlet and the gas outlet can be bores that are provided in the valve housing. Apart from the gas inlet and the gas outlet, the valve housing may be provided with a plurality of further bores which enable a flow of gas through the valve housing. Preferably, the gas regulating unit is at least partly positioned inside the valve housing. Fur this purpose, a bore can be provided which receives the gas regulating unit. This bore can be named gas regulating unit bore. The gas regulating unit bore is fluidly connected to the gas inlet and the gas outlet. "Fluidly connected" means that a fluid, namely gas, can flow from the gas inlet through the gas regulating unit bore and the gas regulating unit itself into the gas outlet.

"Rotatable supported" means that the gas regulating unit is at least partly received in the valve housing and can be rotated relatively to the valve housing. The gas outlet openings can be bores that are provided in the gas regulating unit. The number of gas outlet openings is arbitrarily. The number of gas outlet openings is the same as the number of flame positions. Preferably, the gas outlet openings are provided in the outer surface of the gas regulating unit. For example, there are nine flame positions. Each flame position has at least one determined gas outlet opening. Preferably, there is provided a maximum flame position and a minimum flame position. In the maximum flame position the flow rate of gas is bigger than in the minimum flame position. Between the maximum flame position and the minimum flame position there is provided a plurality of intermediate flame positions. The flow rate of gas can be stepwise reduced by turning the gas regulating unit from the maximum flame position over the intermediate flame positions into the minimum flame position. Apart from the flame positions there is preferably provided a zero position in which the gas valve is completely closed. Preferably, the gas regulating unit can be rotated from the zero position into the maximum flame position. This means, the maximum flame position is next to the zero position.

In each flame position the gas flows from the gas inlet through the gas outlet opening which is assigned to the chosen flame position to the gas outlet. This means, the gas flows through the gas regulating unit. That the cross-sectional areas "differ" from each other means that the cross-sectional areas have different sizes. Preferably, the gas outlet opening which is assigned to the maximum flame position has the biggest cross-sectional area. Vice versa, the gas outlet opening which is assigned to the minimum flame position has the smallest cross-sectional area. The cross-sectional areas of the gas outlet openings reduce stepwise from the maximum flame position towards the minimum flame position. "Cross-sectional area" means a planar zone of the gas outlet opening that can be flowed through by the gas. The cross-sectional area can have the shape of a circle. In this case, the gas outlet openings are circular bores. However, the cross-sectional area also can have a rectangular, triangular or oval shape. The flow rate of gas through the gas outlet openings is depending on their cross-sectional areas. A big cross-sectional area results in a big flow rate, whereas a small cross-sectional area results in a small flow rate.

According to an embodiment, the gas outlet openings are arranged in a row, wherein the cross-sectional area of the gas outlet openings continuously decreases from a maximum flame position of the gas regulating unit towards a minimum flame position of the gas regulating unit.

Preferably, the gas outlet openings are provided on the cylindrical outer surface of the gas regulating unit. As mentioned before, the maximum flame position has the gas outlet openings with the biggest cross-sectional area, whereas the minimum flame position has the gas outlet openings with the smallest cross-sectional area.

According to a further embodiment, the gas outlet openings are arranged in a first row and a second row.

The number of rows is arbitrarily. There can also be exactly one row of gas outlet openings. In the case that there are provided two rows of gas outlet openings, each flame position has exactly two gas outlet openings. The two gas outlet openings of one flame position are preferably arranged on top of each other. For each row of gas outlet openings there is provided preferably one determined bore in the valve housing. This two bores discharge into the gas outlet.

According to a further embodiment, the gas outlet openings of the first row and the gas outlet openings of the second row have different cross-sectional areas.

This means, the gas outlet opening of the first row that is assigned to the maximum flame position has a bigger cross-sectional area than that gas outlet opening of the second row that is assigned to the maximum flame position or vice versa. The same is valid for all other flame positions. Preferably, the gas outlet openings of the first row have bigger cross-sectional areas than the gas outlet openings of the second row.

According to a further embodiment, the gas regulating unit has a tube-shaped gas regulating element, wherein the gas outlet openings are provided in the gas regulating element.

The gas regulating element preferably has a cylindrical shape. "Tube-shaped" means the gas regulating element is hollow. Preferably, the gas regulating element is a hollow cylinder with the gas outlet openings breaking through the outer surface of the gas regulating element. The cylindrical outer surface of the gas regulating unit is preferably part of the gas regulating element.

According to a further embodiment, the gas outlet openings are evenly distributed along a circumferential direction of the gas regulating element.

Hence, a rotation angle of the gas regulating element from one flame position to the next is the same for all flame positions.

According to a further embodiment, the gas regulating element has a gas inlet opening which breaks through the outer surface of the gas regulating unit, wherein the gas outlet openings also break through the outer surface.

The outer surface can be named circumferential wall or outer wall. The outer surface is preferably part of the gas regulating element. Preferably, the gas inlet opening is rectangular. However, the gas inlet opening can have any shape. The gas flows through the gas inlet opening into an interior of the gas regulating element and from the interior through the gas outlet opening that is assigned to the chosen flame position. Preferably, the gas outlet openings are circular bores.

According to a further embodiment, the gas regulating unit comprises an upper spindle, wherein the upper spindle can be used to rotate the gas regulating unit in the valve housing, and a lower spindle, wherein the lower spindle can interact with a magnetic safety valve of the gas valve, and wherein the gas regulating element is arranged between the upper spindle and the lower spindle.

The gas regulating element is sealed towards the spindles in gas-tight way. Hence, a loss of gas is prevented. By pressing the gas regulating unit into the valve housing, the magnetic safety valve can be opened to allow a flow of gas through the gas valve. After igniting the gas, the magnetic safety valve is kept open by means of a solenoid which is energized by a thermoelement. The thermoelement is heated up by a flame of the burner. When the flame expires, the magnetic safety valve closes so that the gas valve is completely closed. This prevents flowing out of unburned gas from the gas burner.

According to a further embodiment, the lower spindle passes through an interior of the gas regulating element and is plugged into the upper spindle.

The lower spindle preferably has a stem that passes through the interior. The stem is plugged into a bore that is provided in the upper spindle. The upper spindle and the lower spindle are connected to each other by means of a pin.

According to a further embodiment, the gas regulating unit is rotatable supported in the valve housing by means of an elastic sealing element.

The sealing elements encompasses the gas regulating unit in a gas tight way. Preferably, the gas regulating element is received in the sealing element. In particular, the sealing element and the gas regulating element are made of self-lubricant materials. This prevents the gas outlet openings from being obstructed by additional grease. In particular, the cylindrical outer surface of the gas regulating unit is contacting the sealing element.

According to a further embodiment, the sealing element is cube-shaped or cuboid-shaped and has a central bore which encompasses the gas regulating unit.

The sealing element is preferably received inside the valve housing.

According to a further embodiment, the sealing element has a gas outlet bore, wherein the gas outlet bore is arranged perpendicular to the central bore, and wherein in each flame position one of the gas outlet openings is arranged before the gas outlet bore.

The gas outlet bore of the sealing element is arranged before the bore that is provided in the valve housing.

According to a further embodiment, the sealing element comprises two gas outlet bores, wherein each of the two gas outlet bores corresponds to one row of gas outlet openings.

Each row of gas outlet openings is assigned to exactly one gas outlet bore of the sealing element. Preferably, the gas outlet bores are arranged on top of each other.

According to a further embodiment, the sealing element is made of a thermostable elastomer.

This prevents the sealing element from being damaged by high temperatures.

Further, a gas stove comprising at least one gas burner and at least one gas valve is provided.

The number of gas burners and gas valves is arbitrarily. There can be provided four gas burners and four gas valves, wherein each gas valve is assigned to one determined gas burner.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further embodiments, features and advantages of the present invention will become apparent from the subsequent description and dependent claims, taken in conjunction with the accompanying drawings, in which:

DETAILED DESCRIPTION OF EXEMPLARY EMBODIMENTS OF THE PRESENT INVENTION

Figure 1:
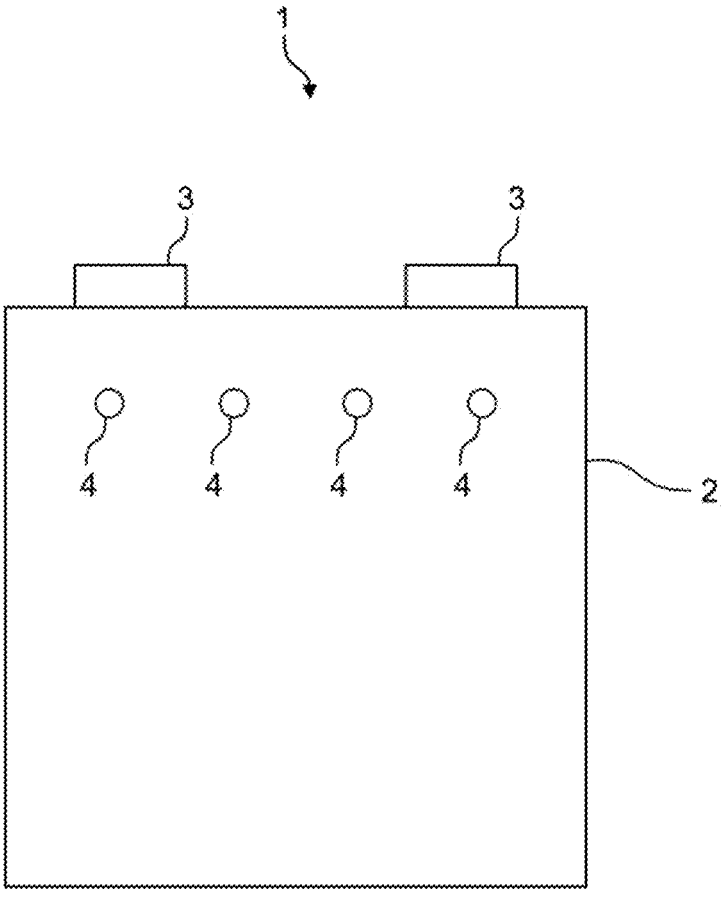
FIG. 1 shows a schematic front view of one embodiment of a gas stove.

In the Figures, like reference numerals designate like or functionally equivalent elements, unless otherwise indicated.

FIG. 1 shows a gas stove 1. The gas stove 1 has a body 2. A plurality of gas burners 3 is provided on the top of the body 2. The number of gas burners 3 is arbitrary. For example, four gas burners 3 are provided. A gas valve 4 is assigned to each gas burner 3. The number of gas valves 4 is preferably the same as the number of gas burners 3. For example, four gas valves 4 are provided. The gas valves 4 are connected to a main gas pipe of the gas stove 1. Each gas valve 4 is arranged between its assigned gas burner 3 and the main gas pipe. The gas valves 4 are arranged to regulate a flow of gas from the main gas pipe to the assigned gas burner 3. In the following, only one gas valve 4 is referred to.

Figure 2:
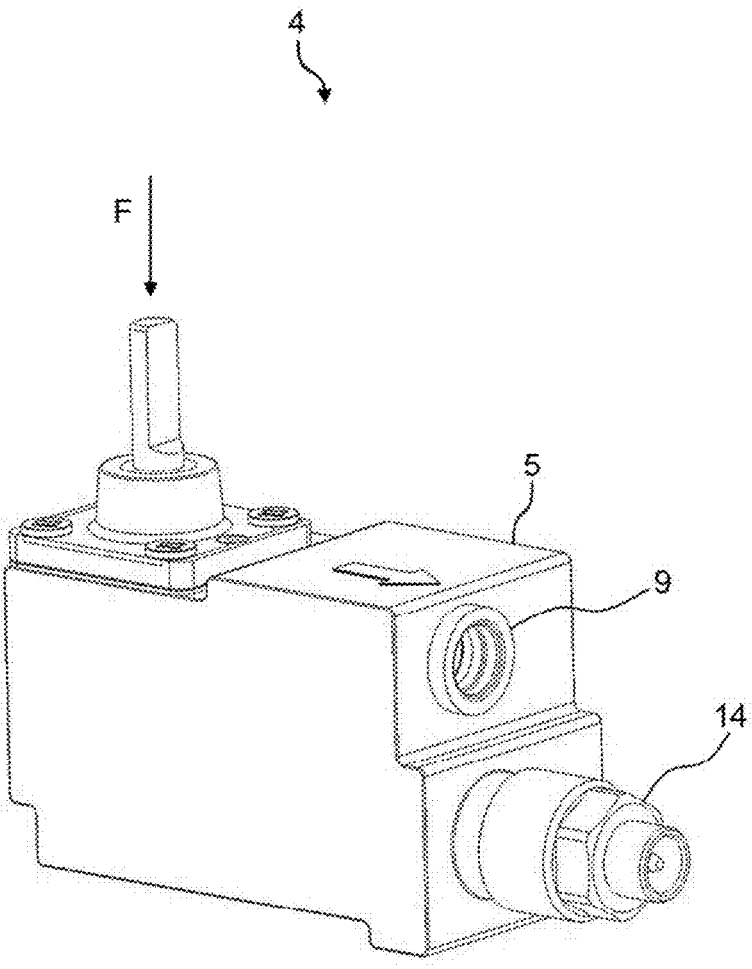
FIG. 2 shows a schematic perspective view of one embodiment of a gas valve for the gas stove according to FIG. 1.
Figure 3:
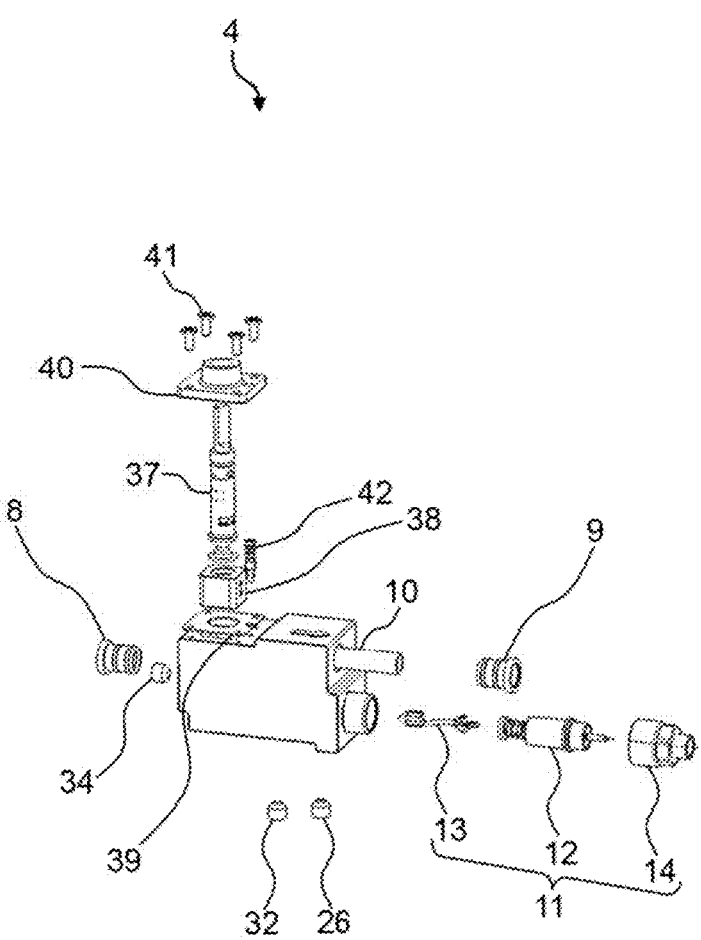
FIG. 3 shows a schematic exploded view of the gas valve according to FIG. 2.
Figure 4:
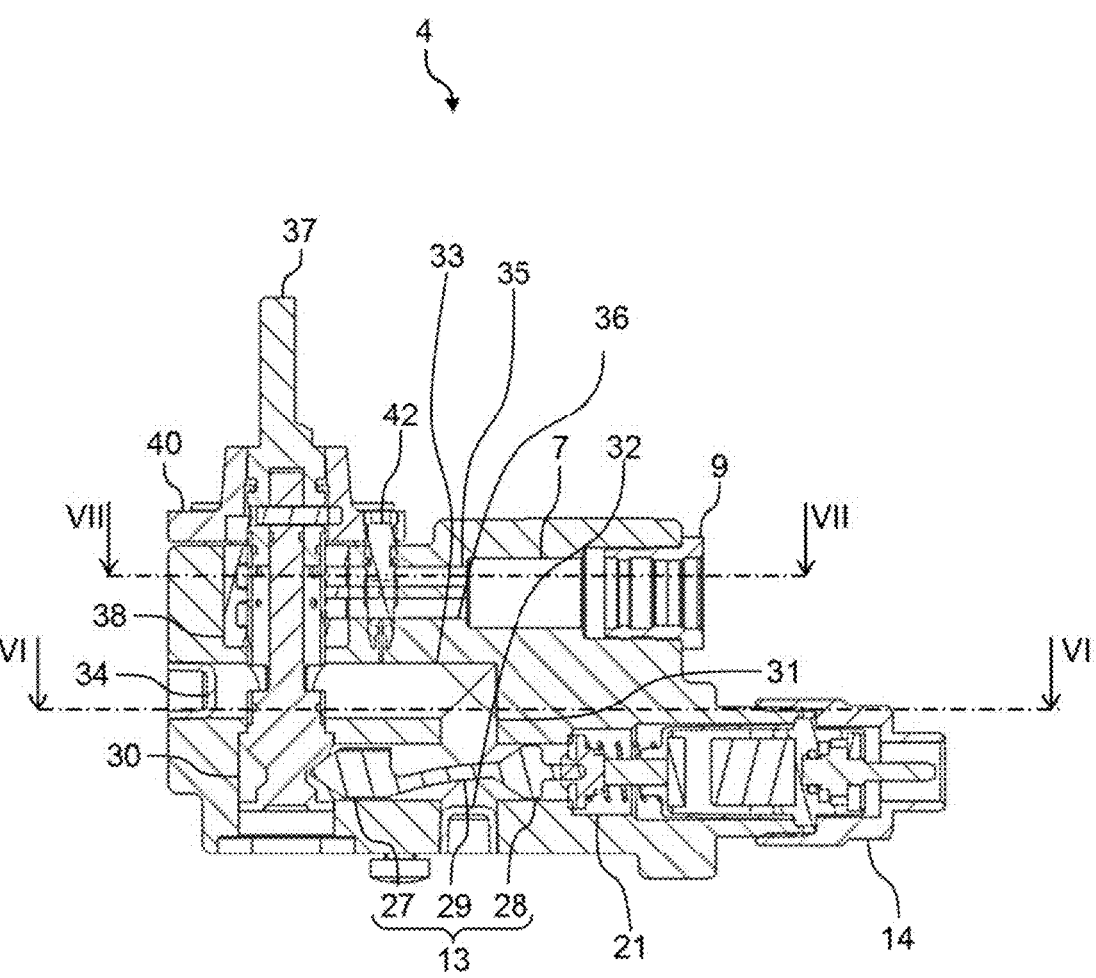
FIG. 4 shows a cross-sectional view of the gas valve according to FIG. 2.
Figure 5:
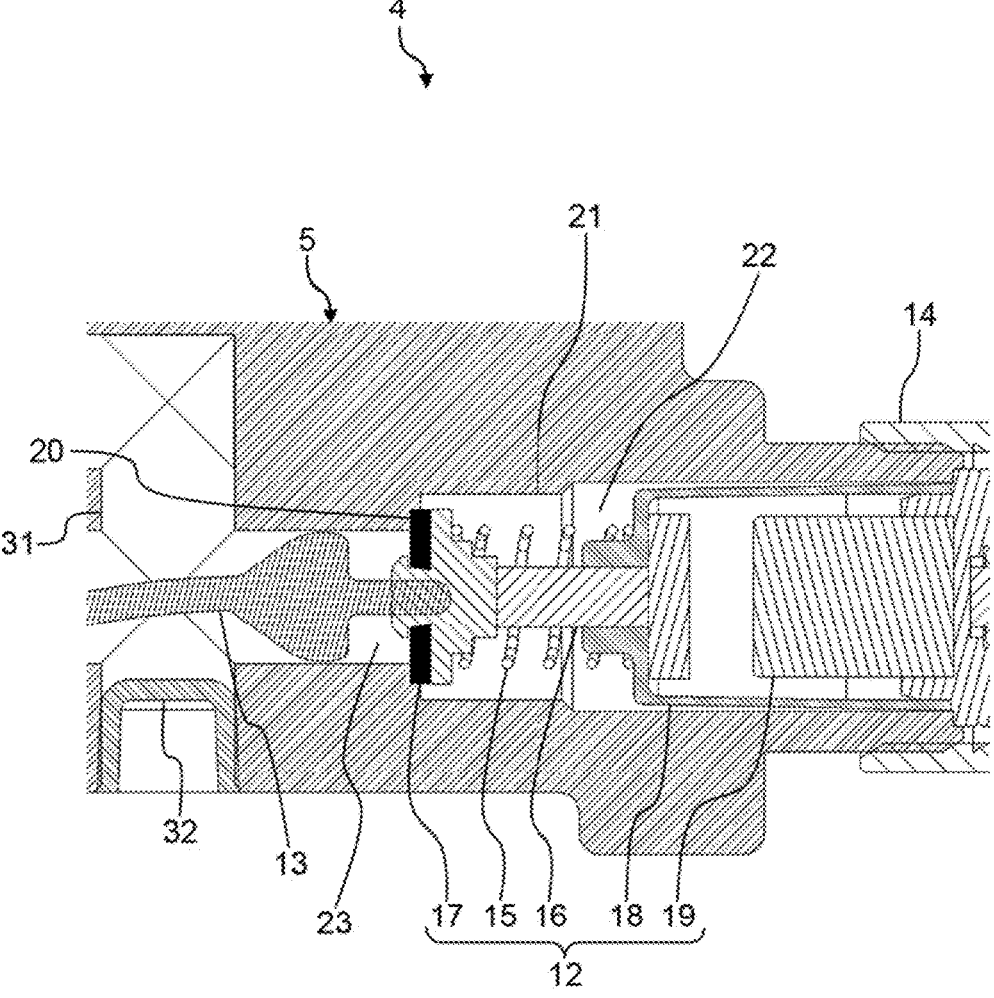
FIG. 5 shows an enlarged cross-sectional view of the gas valve according to FIG. 2.
Figure 6:
FIG. 6 shows a cross-sectional view of the gas valve according to the intersection line VI-VI of FIG. 4.
Figure 6:
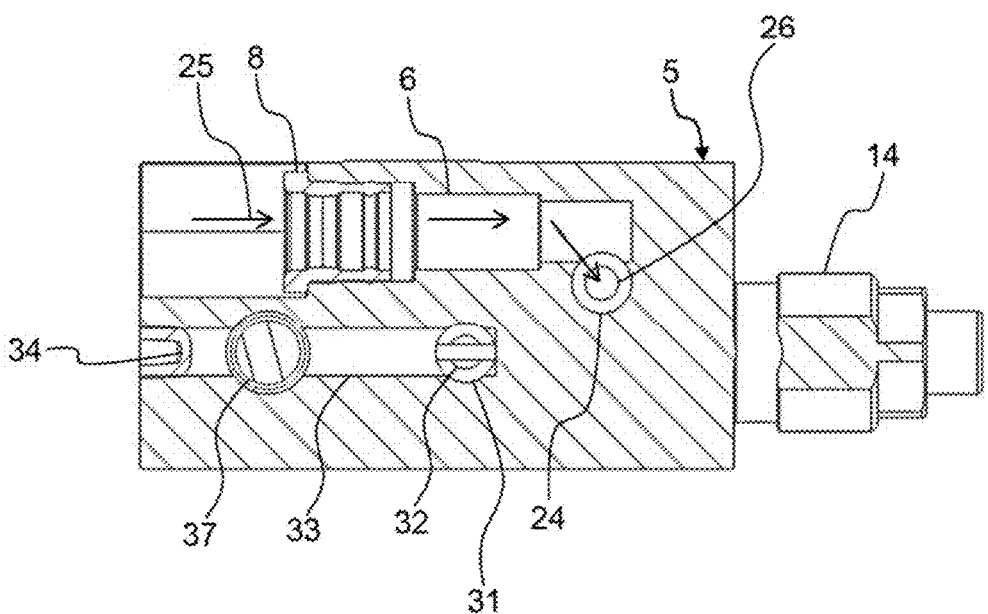
Figure 7:
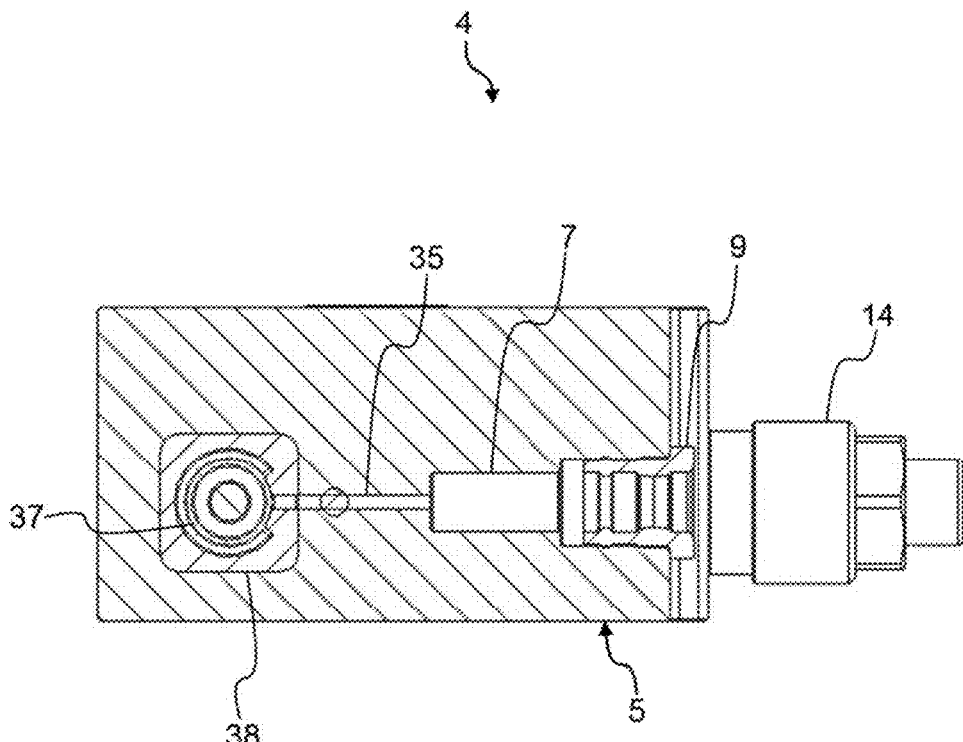
FIG. 7 shows a cross-sectional view of the gas valve according to the intersection line VII-VII of FIG. 4.

FIG. 2 shows a perspective view of one embodiment of the gas valve 4. FIG. 3 shows a perspective exploded view of the gas valve 4. FIGS. 4 and 5 show cross-sectional views of the gas valve 4. FIG. 6 shows a cross-sectional view of the gas valve 4 according to the intersection line VI-VI of FIG. 4. FIG. 7 shows a cross-sectional view of the gas valve 4 according to the intersection line VII-VII of FIG. 4. In the following, FIGS. 2 to 7 are referred to at the same time.

The gas valve 4 comprises a valve housing 5. The valve housing 5 can be made of aluminum, steel or the like. The valve housing 5 comprises a gas inlet 6 and a gas outlet 7. The gas inlet 6 and the gas outlet 7 can be bores that are provided in the valve housing 5. The gas inlet 6 is connected to the main gas pipe. The gas outlet 7 is connected to the gas burner 3. Both the gas inlet 6 and the gas outlet 7 comprise an adapter 8,9. The adapters 8, 9 are used to connect gas pipes 10 to the gas inlet 6 and the gas outlet 7.

A magnetic safety valve 11 is received in the valve housing 5. The magnetic safety valve 11 comprises a magnet unit 12, a pusher 13 and a nut 14. The magnet unit 12 itself comprises a spring 15, a plunger 16, which passes through the spring 15, and a sealing element 17. The sealing element 17 is disc-shaped and is attached to the plunger 16. The sealing element 17 is made of an elastic material like rubber. The pusher 13 is attached to the plunger 16. The magnet unit 12 further comprises a housing 18. In the housing 18, a solenoid 19 is provided.

The solenoid 19 interacts with a thermoelement (not shown). The thermoelement is used to monitor a flame of the gas burner 3. In an operating condition of the gas burner 3, the thermoelement is heated up and the solenoid 19 is energized. The solenoid 19 then pulls—in the orientation of FIG. 5—the plunger 16 to the right against a spring-load of the spring 15. The sealing element 17 is then lifted off a valve seat 20 which is provided in the valve housing 5. The valve seat 20 is part of a stepped first bore 21 which is provided in the valve housing 5. The nut 14 fixes the magnet unit 12 in the first bore 21.

By means of the magnet unit 12, a gas inlet chamber 22 can be fluidly connected to a gas outlet chamber 23. The chambers 22, 23 are part of the first bore 21. When the solenoid 19 is energized, the sealing element 17 is lifted from the valve seat 20 and the chambers 22, 23 are connected to each other. When the solenoid 19 is not energized, that means when the flame of the gas burner 3 expires, the sealing element 17—as shown in FIG. 5—is pressed against the valve seat 20 by means of the spring 15 and the chambers 22, 23 are separated from each other so that no gas flows from the gas inlet chamber 22 into the gas outlet chamber 23. As can be seen from FIG. 6, the gas inlet 6 is connected to the gas inlet chamber 22. This can be done by means of a second bore 24 that is provided in the valve housing 5. The flow of gas 25 is shown in FIG. 6 by means of arrows. The second bore 24 is sealed towards a surrounding of the gas valve 4 by means of a cap 26.

As can be seen from FIG. 4, the pusher 13 has a cone-shaped head 27, a basic section 28 and a curved intermediate section 29 which connects the head 27 to the basic section 28. The basic section 28 is connected to the plunger 16 of the magnet unit 12. The pusher 13 can be made of metal or plastic.

Apart from the bores 21, 24, the valve housing 5 comprises a third bore 30 which is also stepped. The third bore 30 can be named gas regulating unit bore because it receives a gas regulating unit which will be explained later. The third bore 30 runs perpendicular to the first bore 21 and intersects the first bore 21. That means, the third bore 30 is fluidly connected to the first bore 21. A fourth bore 31 runs also perpendicular to the first bore 21. The fourth bore 31 intersects the first bore 21. The fourth bore 31 is sealed to the surrounding of the gas valve 4 by means of a cap 32. The cap 32 can be pressed into the fourth bore 31 so that the fourth bore 31 is closed gastight.

A fifth bore 33 runs parallel to the first bore 21. The fifth bore 33 intersects both, the third bore 30 and the fourth bore 31 and connects the third bore 30 to the fourth bore 31. The fifth bore 33 is sealed by means of a cap 34 to the surrounding of the gas valve 4. Further, there are provided a sixth bore 35 and a seventh bore 36. The bores 35, 36 run parallel to each other. The bores 35, 36 connect the third bore 30 to the gas outlet 7. The bores 35, 36 run perpendicular to the third bore 30.

The gas valve 4 comprises a gas regulating unit 37 which is received in the third bore 30. The gas regulating unit 37 can be turned to regulate the flow of gas from the gas inlet 6 to the gas outlet 7. A sealing element 38 encompasses the gas regulating unit 37. The sealing element 38 is placed inside the third bore 30. The gas regulating unit 37 can be rotated relatively to the sealing element 38. A sealing 39 and a cap 40 are used to mount the gas regulating unit 37 in the valve housing 5. The cap 40 can be attached to the valve housing 5 by means of screws 41. Further, a bypass 42 is provided which can be used to bypass the gas regulating unit 37.

Figure 8:
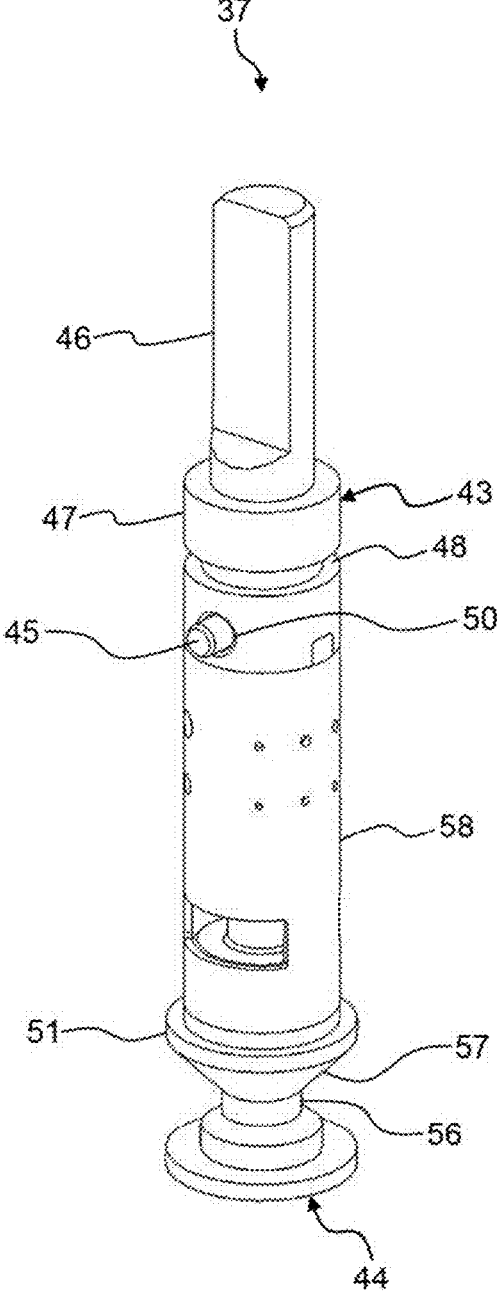
FIG. 8 shows a schematic perspective view of one embodiment of a gas regulating unit for the gas valve according to FIG. 2.
Figure 9:
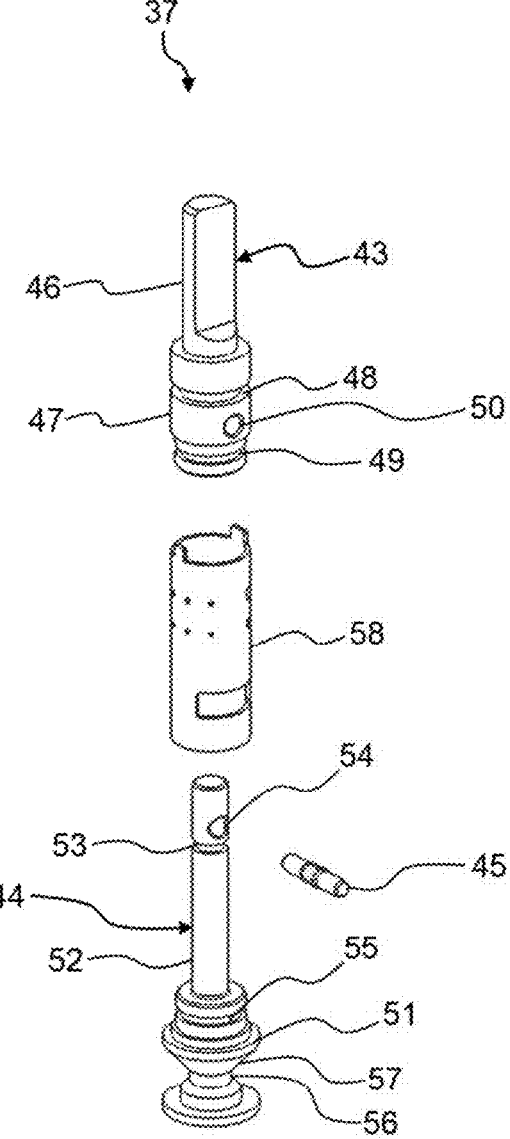
FIG. 9 shows a schematic exploded view of the gas regulating unit according to FIG. 8.

Now returning to the gas regulating unit 37 which is in detail shown FIGS. 8 and 9. The gas regulating unit 37 comprises an upper spindle 43 and a lower spindle 44 which are connected to each other by means of a pin 45. The upper spindle 43 comprises an actuation stem 46 which is flattened for interaction with a knob which is not shown in FIGS. 8 and 9. By means of the knob, the gas regulating unit 37 can be rotated in the third bore 30. The stem 46 protrudes from a basic section 47 of the upper spindle 43. The basic section 47 is cylindrical and comprises two notches 48, 49 and a bore 50 for the pin 45. The bore 50 is arranged between the notches 48, 49. O-rings can be placed in the notches 48, 49. The O-ring which is placed in the notch 48 seals the upper spindle 43 against the cap 40.

The lower spindle 44 comprises a cylindrical basic section 51. A stem 52 protrudes from an upper side of the basic section 51. The stem 52 has a notch 53 for an O-ring. The stem 52 also has a bore 54 for the pin 45. For connecting the spindles 43, 44 together, the stem 52 is inserted into a bore which is provided in the basic section 47 of the upper spindle 43 and the pin 45 is plugged into the bores 50, 54. The O-ring which is placed in the notch 53 seals the spindles 43, 44 against each other's. The basic section 51 has a further notch 55 for an O-ring. The basic section 51 is also provided with a slanted notch 56. The slanted notch 56 has a slanted surface 57 which interacts with the head 27 of the pusher 13.

The gas regulating unit 37 further comprises a gas regulating element 58 which is in details shown in FIGS. 10 to 13. The gas regulating element 58 is placed between the basic sections 47, 51 of the spindles 43, 44. The gas regulating element 58 is a tube with a cylindrical shape. By means of the O-rings placed in the notches 49, 55, the gas regulating element 58 is sealed towards the spindles 43, 44.

The gas regulating element 58 has an upper end 59 which is assigned to the upper spindle 43 and a lower end 60 which is assigned to the lower spindle 44. The ends 59, 60 are open. The upper end 59 is provided with two protrusions 61, 62 that engage with corresponding notches being provided at the basic section 47 of the upper spindle 43. This prevents the gas regulating element 58 from rotating relative towards the spindles 43, 44. The protrusions 61, 62 are arranged at an angle of 180°.

The gas regulating element 58 has a gas inlet opening 63. The gas inlet opening 63 is a rectangular cut-out which is provided in the gas regulating element 58. The gas inlet opening 63 is in interaction with the fifth bore 33. This means, gas 25 can flow through the fifth bore 33 and the gas inlet opening 63 into an interior 64 of the gas regulating element 58.

Figure 13:
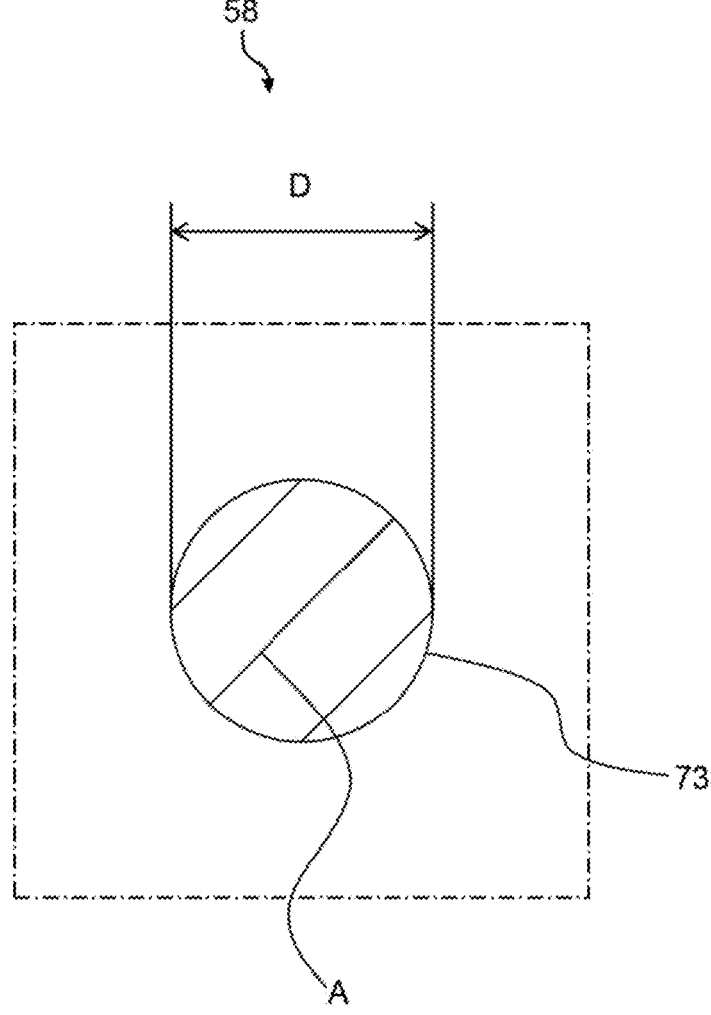
FIG. 13 shows the detail view XIII according to FIG. 12.

The gas regulating element 58 has a plurality of gas outlet openings 65 to 73. The gas outlet openings 65 to 73 can be circular bores. However, the gas outlet openings 65 to 73 can have any other shape. For example, the gas outlet openings 65 to 73 can be rectangular, oval or triangular. The gas outlet openings 65 to 73 have different cross-sectional areas A or diameters D (FIG. 13). In the case that the gas outlet openings 65 to 73 have a circular shape with a diameter D, the cross-sectional area A is defined as follows: $A=\pi*D^2/4$. The number of gas outlet openings 65 to 73 is arbitrary. For example, there are provided nine gas outlet openings 65 to 73 supplying nine flame positions P1 to P9 of the gas regulating element 58.

Figure 12:
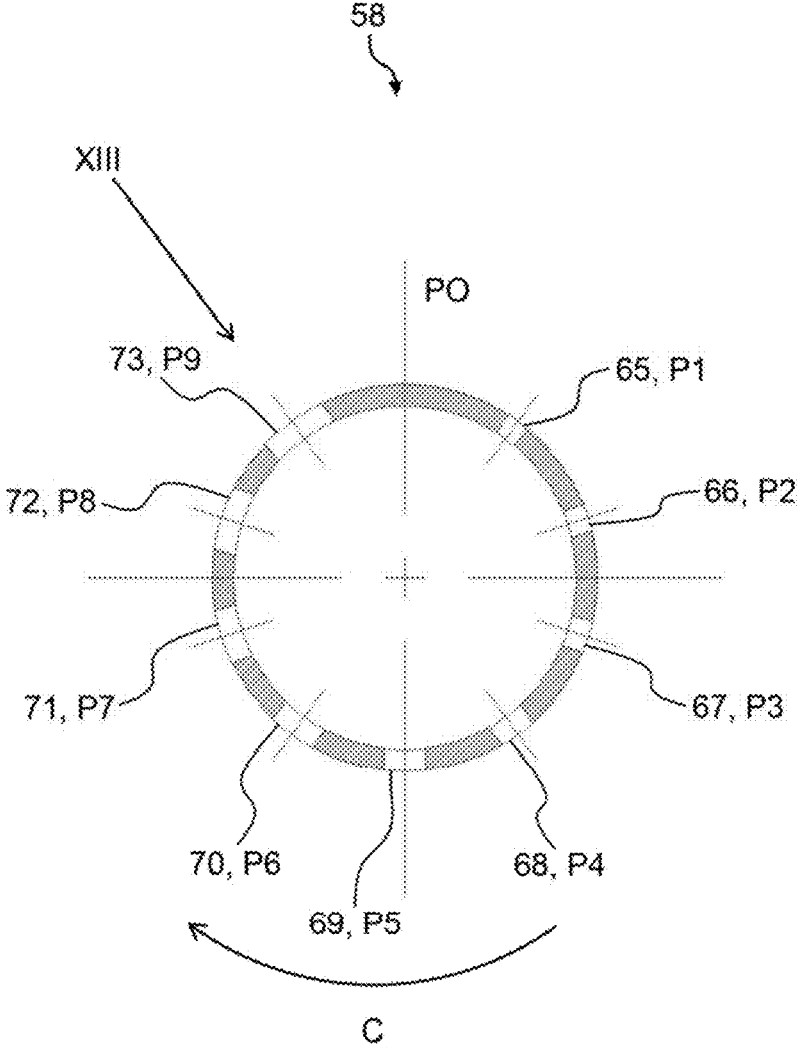
FIG. 12 shows a cross-sectional view of the gas regulating element according to the intersection line XII-XII of FIG. 11.

In a circumferential direction C, which is arranged clockwise in FIG. 12, the cross-sectional area A of the gas outlet openings 65 to 73 increases. In the case that the gas outlet openings 65 to 73 are circular, the diameter D increases in the circumferential direction C from the gas outlet opening 65 in direction to the gas outlet opening 73. That means, the gas outlet opening 65 has the smallest diameter D or cross-sectional area A. The gas outlet opening 73 has the biggest diameter D or cross-sectional area A. In the case that the circumferential direction C is oriented counter-clockwise, the cross-sectional area A or the diameter D decreases from the gas outlet opening 73 in direction of the gas outlet opening 65. The gas outlet openings 65 to 73 are assigned to the bores 35, 36 of the valve housing 5.

Figure 10:
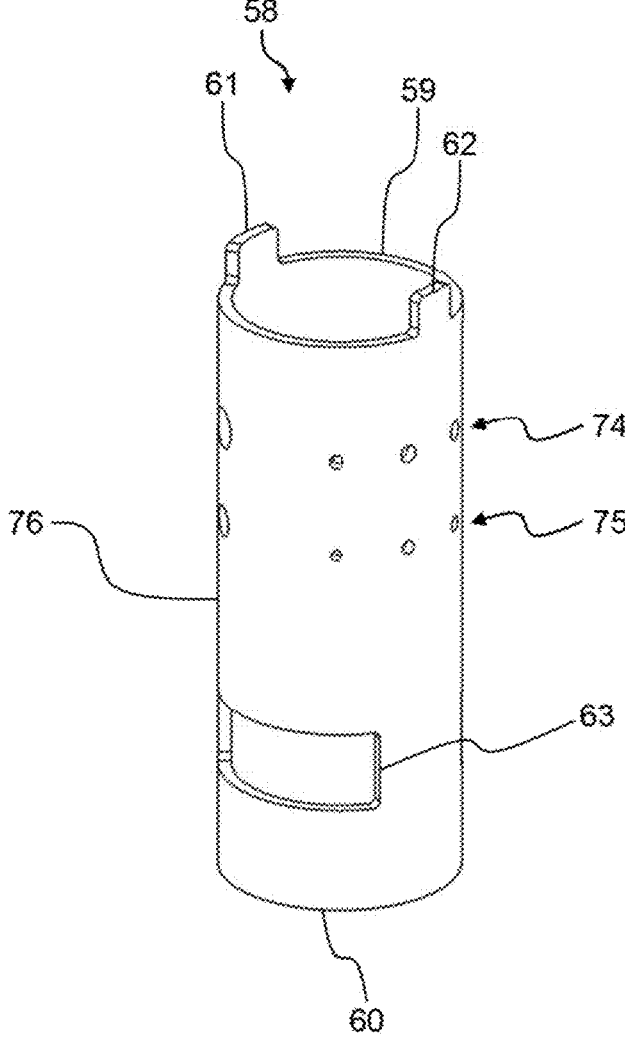
FIG. 10 shows a schematic perspective view of one embodiments of a gas regulating element for the gas regulating unit according to FIG. 8.
Figure 11:
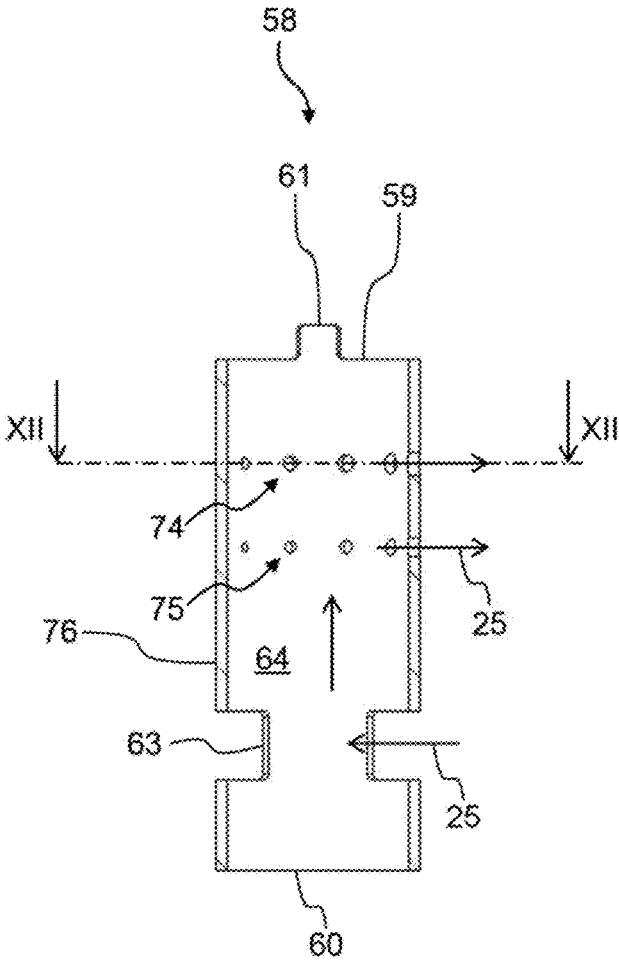
FIG. 11 shows a cross-sectional view of the gas regulating element according to FIG. 10.

As can be seen from FIGS. 10 and 11, there are provided two rows 74, 75 of gas outlet openings 65 to 73. The number of rows 74, 75 is arbitrary. For example, the gas regulating element 58 has two rows 74, 75 of gas outlet openings 65 to 73. Each row 74, 75 has nine gas outlet openings 65 to 73. A first row 74 is assigned to the sixth bore 35 of the valve housing 5. A second row 75 is assigned to the seventh bore 36. So, each row 74, 75 has its own bore 35, 36. The gas outlet openings 65 to 73 of the first row 74 can have bigger cross-sectional areas A or diameters D than the gas outlet openings 65 to 73 of the second row 75. However, the gas outlet openings 65 to 73 of both rows 74, 75 can have the same cross-sectional areas A or diameters D. The gas outlet openings 65 to 73 and the gas inlet opening 63 break through a tube-shaped circumferential wall or outer surface 76 of the gas regulating element 58.

Figure 14:
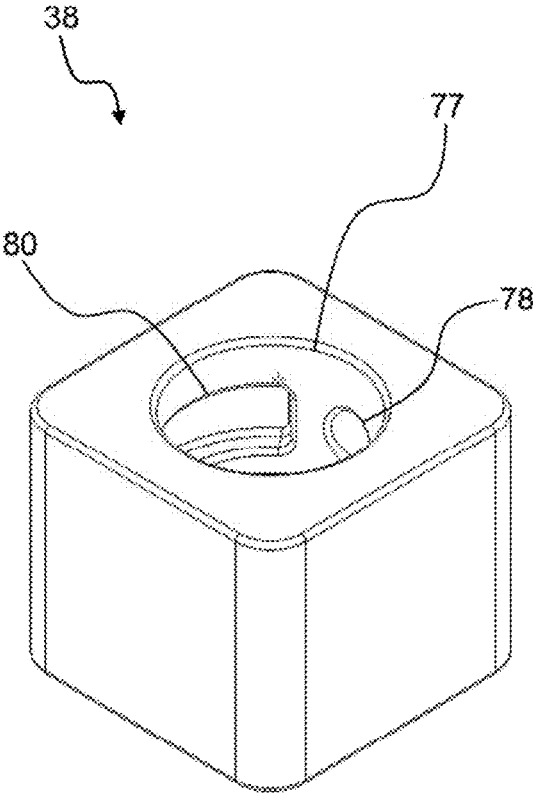
FIG. 14 shows a schematic perspective view of one embodiments of a sealing element for the gas regulating unit according to FIG. 8.
Figure 15:
FIG. 15 shows a schematic cross-sectional view of the sealing element according to FIG. 14.
Figure 15:
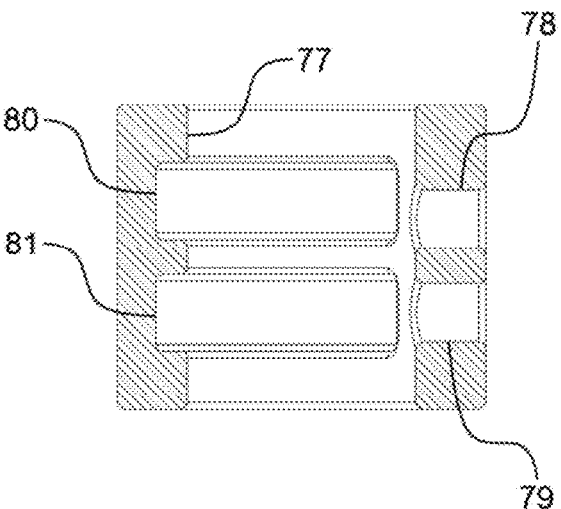

Now returning to the sealing element 38 which is shown in FIGS. 14 and 15. The sealing element 38 is cuboid-shaped and is made of a thermostable elastomer. The sealing element 38 ensures gas tightness between the gas regulating element 58 and the surrounding of the gas valve 4. The sealing element 38 has a central bore 77 which encompasses the gas regulating element 58. The sealing element 38 has two gas outlet bores 78, 79 which are arranged perpendicular to the central bore 77. A first gas outlet bore 78 can connect one of the gas outlet openings 65 to 73 of the first row 74 to the sixth bore 35 of the valve housing 5. A second gas outlet bore 79 can connect one of the gas outlet openings 65 to 73 of the second row 75 to the seventh bore 36 of the valve housing 5.

The sealing element 38 has two notches 80, 81 that both end before the gas outlet bores 78, 79. This means, the notches 80, 81 do not run completely around the central bore 77. A first notch 80 is assigned to the first row 74. A second notch 81 is assigned to the second row 75. The notches 80, 81 can fluidly connect the gas outlet openings 65 to 73 that are not positioned over the first gas outlet bore 78 or the second gas outlet bore 79 to each other.

The functionality of the gas valve 4 is explained in the following. To light up the gas burner 3, the gas regulating unit 37 is pressed into the valve housing 5 by means of a force F (FIG. 2) acting on the knob that is attached to the stem 46 of the upper spindle 43. By pressing the gas regulating element 58 down, the slanted surface 57 of the lower spindle 44 interacts with the head 27 of the pusher 13 to lift the sealing element 17 from the valve seat 20. The chambers 22, 23 are now connected allowing gas 25 to flow from the gas inlet 6 through the bores 21, 31 and 33 and the gas inlet opening 63 into the interior 64 of the gas regulating element 58. When pressing down the gas regulating unit 37, at the same time an ignition element (not shown) is activated to produce a spark at the gas burner 3. The spark is used to ignite the gas 25.

Simultaneously when pressing the gas regulating unit 37 down, it is rotated from a closed position or zero position P0 (FIG. 12) into a maximum flame position P9. In the maximum flame position P9, the gas outlet opening 73 with the biggest cross-sectional area A or with the biggest diameter D is positioned before the gas outlet bores 78, 79 of the sealing element 38. The gas 25 can now flow from the interior 64 of the gas regulating element 58 into the bores 35, 36 of the valve housing 5 and through the gas outlet 7 to the gas burner 3. As soon as the gas 25 ignites, the thermoelement is heated up to energize the solenoid 19 of the magnet unit 12. The magnet unit 12 now holds the sealing element 17 away from the valve seat 20 so that the force F can be released from the gas regulating unit 37. An angle between the zero position P0 and the maximum flame position P9 can have 36°.

To adjust the power of the gas burner 3, the gas regulating unit 37 can be rotated in nine steps from the maximum flame position P9 into a minimum flame position P1. An angle between the zero position P0 and the minimum flame position P1 can have 324°. In the maximum flame position P9, the gas burner 3 has the highest power. In the minimum flame position P1, the gas burner 3 has the lowest power. Positions P8 to P2 define different power conditions of the gas burner 3. The positions P8 to P2 are intermediate flame positions. The power of the gas burner 3 is stepwise reduced by turning the gas regulating unit 37 from the maximum flame position P9 to the minimum flame position P1.

This is done by the reducing cross-sectional areas A or diameters D of the gas outlet openings 65 to 73. The gas outlet openings 65 to 73 are calibrated to different diameters D to increase the flow rate of the gas 25 from the minimum flame position P1 to the maximum flame position P9 and vice versa.

To turn the gas burner 3 off, the gas regulating unit 37 is rotated into the zero position P0. In the zero position P0, none of the gas outlet openings 65 to 73 is positioned before one of the gas outlet bores 78, 79 of the sealing element 38. The flow of gas 25 is blocked and the flame at the gas burner 3 expires. As the flame expires, the thermoelement cools down. The solenoid 19 is no more energized and the spring 15 urges the sealing element 17 against the valve seat 20. Also, when the flame expires for any other reason, for example due to a strong air draft, the thermoelement cools down and the sealing element 17 is pressed against the valve seat 20 preventing the exhaustion of unburned gas 25. The movable parts of the gas valve 4 are made of self-lubricant materials Although the present invention has been described in accordance with preferred embodiments, it is obvious for the person skilled in the art that modifications are possible in all embodiments.

The invention claimed is:

1. A gas valve for a gas stove, the gas valve comprising:
   a valve housing having a gas inlet and a single gas outlet, wherein two bores of the valve housing lead to the single gas outlet; and
   a gas regulating unit having a cylindrical outer surface and a plurality of discrete pairs of gas outlet openings passing through the cylindrical outer surface, wherein the gas regulating unit is supported in the valve housing via the cylindrical outer surface and configured to be rotated into a plurality of individual flame positions, wherein each of the individual flame positions is assigned to a corresponding one of the discrete pairs of gas outlet openings, and wherein the gas regulating unit further includes a gas inlet opening passing through the cylindrical outer surface;
   wherein each discrete pair of gas outlet openings includes a first discrete gas outlet opening configured to align with a first one of the two bores and a second discrete gas outlet opening configured to align with a second one of the two bores;
   wherein the first discrete gas outlet openings are arranged in a first row and the second discrete gas outlet openings are arranged in a second row, wherein the first row is disposed farther from the gas inlet than the second row, and wherein the first discrete gas outlet opening of each respective discrete pair has a larger cross-sectional area than the second discrete gas outlet opening of the respective discrete pair;
   wherein the gas inlet is configured to be connected to the single gas outlet when the gas regulating unit assumes a determined one of the individual flame positions via the corresponding one of the discrete pairs of gas outlet openings aligning with the two bores, each of the discrete pairs of gas outlet openings having a different combined cross-sectional area than each other pair, such that the individual flame positions are configured to have different gas flow rates; and
   wherein the gas inlet opening is configured to receive gas from the gas inlet into an interior of the gas regulating unit such that the gas exits the gas regulating unit through the corresponding one of the discrete pairs of gas outlet openings aligned with the two bores.

2. The gas valve of claim 1, wherein the cross-sectional area of the first discrete gas outlet openings continuously decreases from a maximum flame position of the gas regulating unit towards a minimum flame position of the gas regulating unit.

3. The gas valve of claim 1, wherein the gas regulating unit comprises a tube-shaped gas regulating element.

4. The gas valve of claim 3, wherein the discrete pairs of gas outlet openings are evenly distributed along a circumferential direction of the gas regulating element.

5. The gas valve of claim 3, further comprising a magnetic safety valve, said gas regulating unit comprising an upper spindle configured to permit rotation of the gas regulating unit in the valve housing, and a lower spindle configured to interact with the magnetic safety valve, said gas regulating element being arranged between the upper spindle and the lower spindle.

6. The gas valve of claim 5, wherein the lower spindle passes through an interior of the gas regulating element and is plugged into the upper spindle.

7. The gas valve of claim 1, further comprising an elastic sealing element, said gas regulating unit being supported for rotation in the valve housing by the elastic sealing element.

8. The gas valve of claim 7, wherein the elastic sealing element is cube-shaped or cuboid-shaped and has a central bore which encompasses the gas regulating unit.

9. The gas valve of claim 8, wherein the elastic sealing element has a pair of gas outlet bores in perpendicular arrangement to the central bore, wherein in each of the individual flame positions one of the discrete pairs of gas outlet openings is arranged before the pair of gas outlet bores.

10. The gas valve of claim 7, wherein the elastic sealing element is made of a thermostable elastomer.

11. The gas valve of claim 1, wherein exactly zero or exactly one of the discrete pairs of gas outlet openings aligns with the two bores in any given rotational position of the cylindrical outer surface.

12. The gas valve of claim 1, wherein the two bores extend in a same direction as the single gas outlet.

13. A gas valve for a gas stove, the gas valve comprising:

a valve housing having a gas inlet, a gas outlet, and a pair of internal bores leading to the gas outlet; and a gas regulating unit selectively coupling the gas inlet to the gas outlet via the pair of internal bores;

wherein the gas regulating unit is tubular, having a cylindrical outer surface, and is supported in the valve housing with a long axis of the gas regulating unit oriented transverse to the pair of bores;

wherein the cylindrical outer surface of the gas regulating unit includes a gas inlet opening and a plurality of discrete gas outlet openings arranged in two rows spaced around a circumference of the cylindrical outer surface, wherein the plurality of discrete gas outlet openings are arranged into a plurality of discrete pairs, and wherein the gas regulating unit is configured to be rotated into a plurality of individual flame positions, each individual flame position configured to register exactly one respective discrete pair of the discrete gas outlet openings with the pair of internal bores;

wherein each discrete pair of the discrete gas outlet openings has a different combined cross-sectional area, such that the individual flame positions are configured to have different gas flow rates; and wherein the two rows of the discrete gas outlet openings include a first row and second row, wherein the first row is disposed farther from the gas inlet than the second row, wherein each discrete pair includes a first discrete gas outlet opening disposed in the first row and a second discrete gas outlet opening disposed in the second row, and wherein the first discrete gas outlet opening of each respective discrete pair has a larger cross-sectional area than the second discrete gas outlet opening of the respective discrete pair; and wherein the gas inlet opening is configured to receive gas from the gas inlet into an interior of the gas regulating unit such that the gas exits the gas regulating unit through the respective discrete pair of the discrete gas outlet openings registered with the pair of internal bores.

14. The gas valve of claim 13, wherein exactly zero or exactly one of the discrete pairs of the discrete gas outlet openings registers with the two bores in any given rotational position of the cylindrical outer surface.

15. The gas valve of claim 13, wherein the two bores extend in a same direction as the gas outlet.

* * * * *